US012562855B2

(12) United States Patent
Wu et al.

(10) Patent No.: US 12,562,855 B2
(45) Date of Patent: Feb. 24, 2026

(54) TECHNIQUES FOR MONITORING AND CONTROL OF HIGH SPEED SERIAL COMMUNICATION LINK

(71) Applicant: Altera Corporation, San Jose, CA (US)

(72) Inventors: Hsinho Wu, Santa Clara, CA (US); Peng Li, Palo Alto, CA (US); Masashi Shimanouchi, San Jose, CA (US)

(73) Assignee: ALTERA CORPORATION, San Jose, CA (US)

( * ) Notice: Subject to any disclaimer, the term of this patent is extended or adjusted under 35 U.S.C. 154(b) by 838 days.

(21) Appl. No.: 17/483,771

(22) Filed: Sep. 23, 2021

(65) Prior Publication Data

US 2023/0094919 A1 Mar. 30, 2023

(51) Int. Cl.
*H04L 1/20* (2006.01)
*H04L 1/00* (2006.01)

(52) U.S. Cl.
CPC .............. *H04L 1/20* (2013.01); *H04L 1/0045* (2013.01)

(58) Field of Classification Search
CPC ........................................................ H04L 1/20
USPC ........................................................ 375/227
See application file for complete search history.

(56) References Cited

U.S. PATENT DOCUMENTS

| | | | |
|---|---|---|---|
| 9,397,868 B1 * | 7/2016 | Hossain | ................ H04L 7/0087 |
| 9,787,465 B1 * | 10/2017 | Caudill | .................. H04L 1/203 |
| 10,020,967 B1 | 7/2018 | Li et al. | |
| 10,476,716 B2 | 11/2019 | Li et al. | |
| 12,003,352 B2 | 6/2024 | Li et al. | |
| 2003/0072395 A1 | 4/2003 | Jia et al. | |
| 2003/0210667 A1 | 11/2003 | Zhengdi | |
| 2006/0242498 A1 * | 10/2006 | Hamilton | ....... G01R 31/318371 |
| | | | 714/724 |
| 2008/0049600 A1 | 2/2008 | Liu | |
| 2022/0116133 A1 * | 4/2022 | Medra | .................. H04B 7/0689 |

OTHER PUBLICATIONS

Extended European Search Report issued Apr. 1, 2023 for EP Application No. 22188701.1, 10 pages.

* cited by examiner

*Primary Examiner* — Lihong Yu
(74) *Attorney, Agent, or Firm* — Fletcher Yoder, PC

(57) ABSTRACT

Various embodiments provide apparatuses, systems, and methods to determine a figure of merit (FOM) of a communication link (e.g., a serial communication link, also referred to herein as a channel) between a transmitter and a receiver. The FOM may be used to, for example, determine a health of the communication link during mission mode (normal operating mode), determine a modulation scheme to use for the communication link, determine a configuration to use for the receiver and/or transmitter, and/or another suitable use case. Other embodiments may be described and claimed.

25 Claims, 9 Drawing Sheets

600

602

First fitted SBR from waveform with first
modulation scheme (e.g., PAM-x)
602

604

Compute SR from first SBR
604

606

Upsample SR based on LCM of
PAM-x UI and PAM-y UI
606

608

SR Ripple/Noise Filtering
608

610

Compute PAM-y SBR
610

PAM-y SBR

Computing System 950

Processor Circuitry 952

Instructions 988

Memory Circuitry 954

Instructions 982

Storage Circuitry 958

Logic 983

Acceleration circuitry 964

Comm. Circuitry 966

Network 963

Input circuitry 986

Interface Circuitry 970

External Devices 972

Output Ciruitry 984

956

TECHNIQUES FOR MONITORING AND CONTROL OF HIGH SPEED SERIAL COMMUNICATION LINK

FIELD

Embodiments of the present invention relate generally to the technical field of electronic circuits, and more particularly to techniques for monitoring and control of electronic communication links.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

High-speed serial link technologies continue to advance and provide higher channel bandwidth. For example, some serial link technologies are moving beyond gigabits per second (Gbps), such as 224 Gbps. The demands and advancements of high-speed serial link technologies brings several challenges, such as channel bandwidth, distortions (e.g., inter-symbol interference (ISI), jitter, noise, etc.), cost/power efficiency (e.g., due to circuit complexity), latency, and others.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
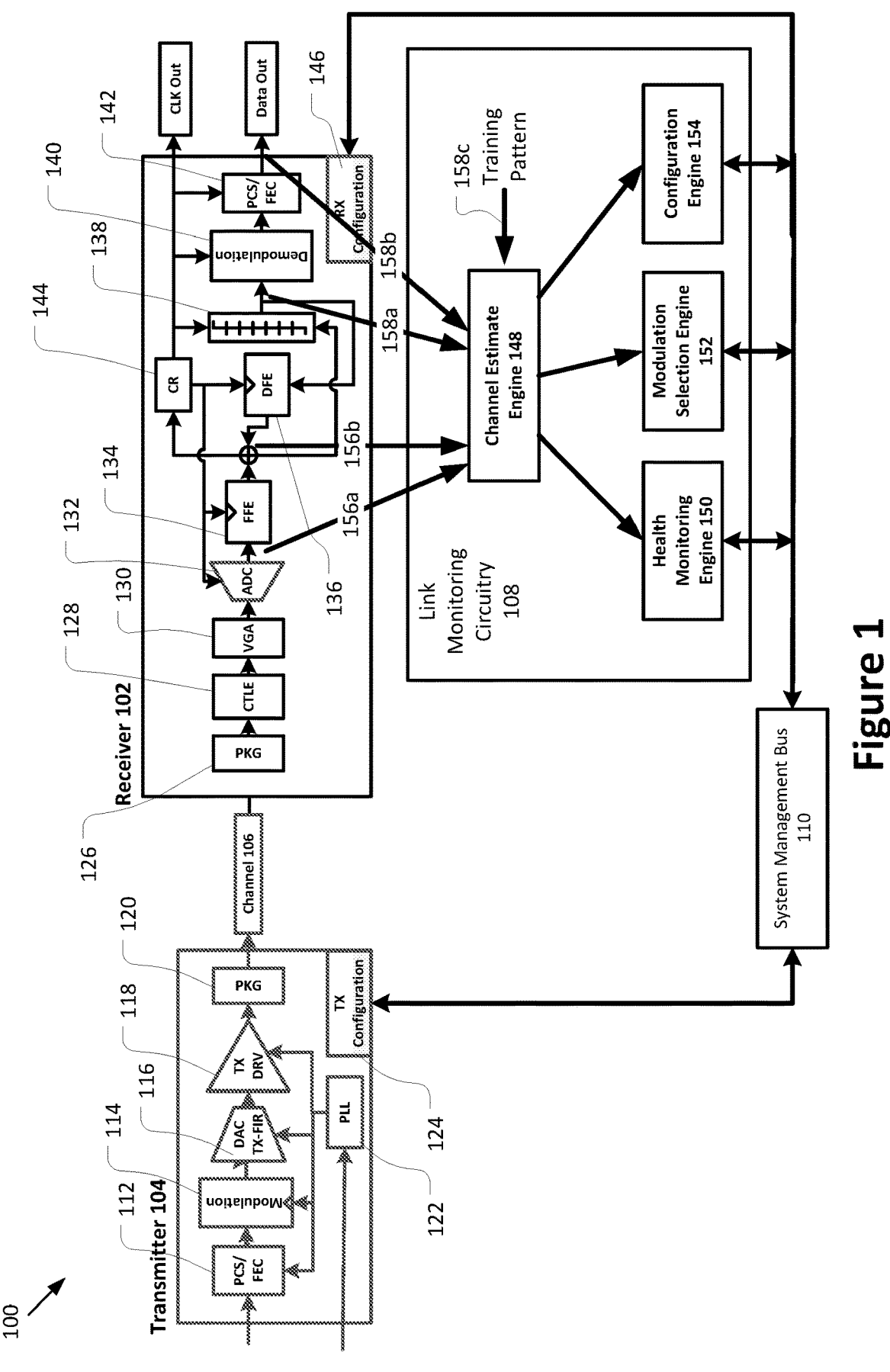
FIG. 1 illustrates a system including a transmitter, a receiver, and link monitoring circuitry to monitor a communication link between the transmitter and receiver, in accordance with various embodiments.

Various embodiments herein provide techniques to determine a figure of merit (FOM) of a communication link (e.g., a serial communication link, also referred to herein as a channel) between a transmitter and a receiver. The FOM may be used to, for example, determine a health of the communication link during mission mode (normal operating mode), determine a modulation scheme to use for the communication link, determine a configuration to use for the receiver and/or transmitter, and/or another suitable use case.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Various embodiments herein provide techniques to determine a figure of merit (FOM) of a communication link (e.g., a serial communication link, also referred to herein as a channel) between a transmitter and a receiver. The FOM may be used to, for example, determine a health of the communication link during mission mode (normal operating mode), determine a modulation scheme to use for the communication link, determine a configuration to use for the receiver and/or transmitter, and/or another suitable use case.

A link monitoring circuitry may be coupled to the receiver to determine the FOM. The receiver may receive a data signal from the transmitter via the communication link and determine digital bits encoded by the data signal. The link monitoring circuitry may receive samples of an analog waveform that corresponds to the received data signal (e.g., via one or more analog-to-digital converters (ADCs)). The samples may be received before or after equalization (e.g., feed forward equalization (FFE), decision feedback equalization (DFE) and/or another suitable type of equalization). The link monitoring circuitry may further receive the digital bits recovered by the receiver. The digital bits received by the link monitoring circuitry may be before or after error correction (e.g., forward error correction (FEC)) is applied.

In various embodiments, the link monitoring circuitry may determine the FOM based on the received samples and digital bits. For example, the link monitoring circuitry may determine a system or link response (e.g., single bit response (SBR)) of the channel and/or a noise measurement based on the received samples and digital bits. The FOM may be determined based on the impulse response and/or the noise measurement. In some embodiments, the link monitoring circuitry may perform waveform fitting to generate a fitted waveform from the samples, align the fitted waveform with the received digital bits to generate an aligned waveform, and determine the impulse response based on the aligned waveform.

Additionally, or alternatively, in some embodiments the link monitoring circuitry may identify a time period for the noise measurement based on the received digital bits (e.g., based on a data pattern of the digital bits). The link monitoring circuitry may perform the noise measurement using the samples of the analog waveform based on the determined time period. For example, the time period may be selected to correspond to a portion of the samples for which the associated digital bits have the same logic value.

The FOM may include one or more metrics, such as signal-to-noise ratio (SNR), signal-to-distortion-and-noise ratio (SNDR), channel operating margin (COM), link margin, etc. In some embodiments, the FOM may account for the potential of the link, e.g., by being based on one or more of transmitter equalization (EQ) parameter(s), receiver EQ parameter(s), system/device induced jitter and/or noise, and/or error correction (e.g., FEC) gain.

In some embodiments, the waveform samples received by the link monitoring circuitry may include only 1 sample per unit interval (UI) of the data signal. Accordingly, no additional AIDCs may be needed, apart from the ADC that is already included in the receiver. Alternatively, additional ADCs may be included in the link monitoring circuitry to generate additional samples of the analog waveform.

In some embodiments, the health monitoring based on the FOM may be performed during mission mode of the receiver/transmitter using real data (e.g., data that is unknown to the receiver). In contrast, the determination of the modulation scheme and/or receive/transmit configuration may be performed using training data with a data pattern that is known to the receiver. However, the embodiments of the present disclosure are not limited in this regard.

In some embodiments, the link monitoring circuitry may determine respective FOMs for multiple modulation schemes based on training data that was transmitted over the communication link using one modulation scheme. The link monitoring circuitry may select the modulation scheme that has the highest FOM and/or base the selection on the FOM and one or more other factors (e.g., a bandwidth, power efficiency, and/or other parameter of the modulation scheme).

Additionally, or alternatively, the link monitoring circuitry may determine respective FOMs for multiple configurations of the communication link and/or device. The FOMs may be determined based on training data transmitted over the communication link. The configuration may include, for example, equalization parameters (e.g., number of stages, length of FFE/DFE), signal amplitude, and/or FEC parameters (e.g., FEC code complexity). In some embodiments, the link monitoring circuitry may select the configuration that has the best FOM and/or based on the FOM and one or more other factors. In some embodiments, the link monitoring circuitry may determine the configuration based on a target FOM (e.g., that is lower than the highest FOM), enabling the configuration to provide lower power consumption, lower latency, and/or other performance savings while still providing the target FOM. For example, if the channel/ link estimate (e.g., SBR) is found to exceed a target bit error rate (BER), the link monitoring circuitry may reduce the equalization structure (e.g., use fewer stages and/or shorter FFE/DFE), reduce signal amplitude, and/or select a simpler FEC code to reduce power and/or latency while still keeping the BER at or above the target BER.

In various embodiments, the link monitoring circuitry may be included in the same device (e.g., integrated circuit, circuit board, and/or system) as one or more components of the receiver. For example, the link monitoring circuitry may be implemented in a field programmable gate array (FPGA), an application specific integrated circuit (ASIC), and/or other suitable circuitry. Alternatively, some or all of the link monitoring circuitry may be implemented in a separate device (e.g., another computer) from the receiver.

Additional features and/or benefits of the various embodiments herein will be apparent from the figures and associated description below.

FIG. 1 illustrates a system 100 that includes a receiver 102 and a transmitter 104 that communicate via a channel 106 (also referred to as communication link 106). The system 100 further includes a link monitoring circuitry 108 coupled to the receiver. Additionally, the system 100 includes a system management bus 110 to enable the receiver 102, transmitter 104, and/or link monitoring circuitry 108 to configure and/or negotiate one or more parameters for the communication link 106. In some embodiments, the system management bus 110 may be via the communication link 106. The receiver 102 and transmitter 104 may be on different integrated circuit dies, and may be part of the same device or different devices. Some example implementations are discussed below with reference to FIG. 7.

The transmitter 104 may include a physical coding sublayer (PCS)/forward error correction (FEC) block 112, a modulation block 114, a digital-to-analog converter (DAC) 116 (e.g., with a transmit (Tx) finite impulse response (FIR) filter), a Tx driver 118, and a Tx package (PKG) 120 in the transmit chain, as shown, The transmitter 104 may further include a phase locked loop (PLL) 122 and/or a Tx configuration circuit 124.

The receiver 102 may include a receive (Rx) PKG 126, a continuous time linear equalization (CTLE) block 128, a variable gain amplifier (VGA) 130, an ADC 132, a FFE circuit 134, a DFE circuit 136, a digital conversion block 138 that converts the equalized waveform samples (e.g., generated by the FFE circuit 134 and DFE circuit 136) into digital logic values, a demodulation circuit 140, and/or a PCS/FEC circuit 142 in the receive chain. The receiver 102 may further include a clock recovery (CR) circuit 144 and/or a Rx configuration circuit 146.

In various embodiments, the link monitoring circuitry 108 may include a channel estimate engine 148 to determine one or more link characteristics of the communication link 106. The link monitoring circuitry 108 may further determine a FOM for the communication link 106 based on the one or more link characteristics. For example, the one or more link characteristics may include a link or system response (e.g., SBR) and/or a noise measurement, as discussed further herein.

The link monitoring circuitry 108 may further include a health monitoring engine 150, a modulation selection engine 152, and/or a configuration engine 154 that receive the FOM (and/or the one or more link characteristics) from the channel estimate engine 148. The health monitoring engine 150 may determine the health of the communication link 106 based on the FOM. The modulation selection engine 152 may determine a modulation scheme to use based on FOMs for respective modulation schemes. The configuration engine 154 may determine a receive configuration and/or a transmit configuration based on one or more FOMs. Example use cases of the health monitoring engine 150, modulation selection engine 152, and configuration engine 154 are described further elsewhere herein.

In various embodiments, the channel estimate engine 148 may receive, from the receiver 102, samples of the analog waveform that corresponds to the data signal received by the receiver 102 over the communication link 106. The samples may be received before equalization (e.g., as indicated by arrow 156a in FIG. 1) and/or after equalization (e.g., as indicated by arrow 156b in FIG. 1). The channel estimate engine 148 may further receive digital bits that correspond to the data signal. For example, the digital bits may be received from the receiver 102 as recovered by the receiver 102 from the data signal. The digital bits may be received before error correction (e.g., as indicated by arrow 158a in FIG. 1) and/or after error correction (e.g., as indicated by arrow 158b in FIG. 1). Additionally, or alternatively, the digital bits may be known training data, e.g., as indicated by arrow 158c in FIG. 1.

The channel estimate engine 148 may determine the one or more link characteristics (e.g., SRB and/or noise measurement) based on the samples and/or the digital bits. Additionally, the channel estimate engine 148 may determine the FOM based on the one or more link characteristics.

Figure 2:
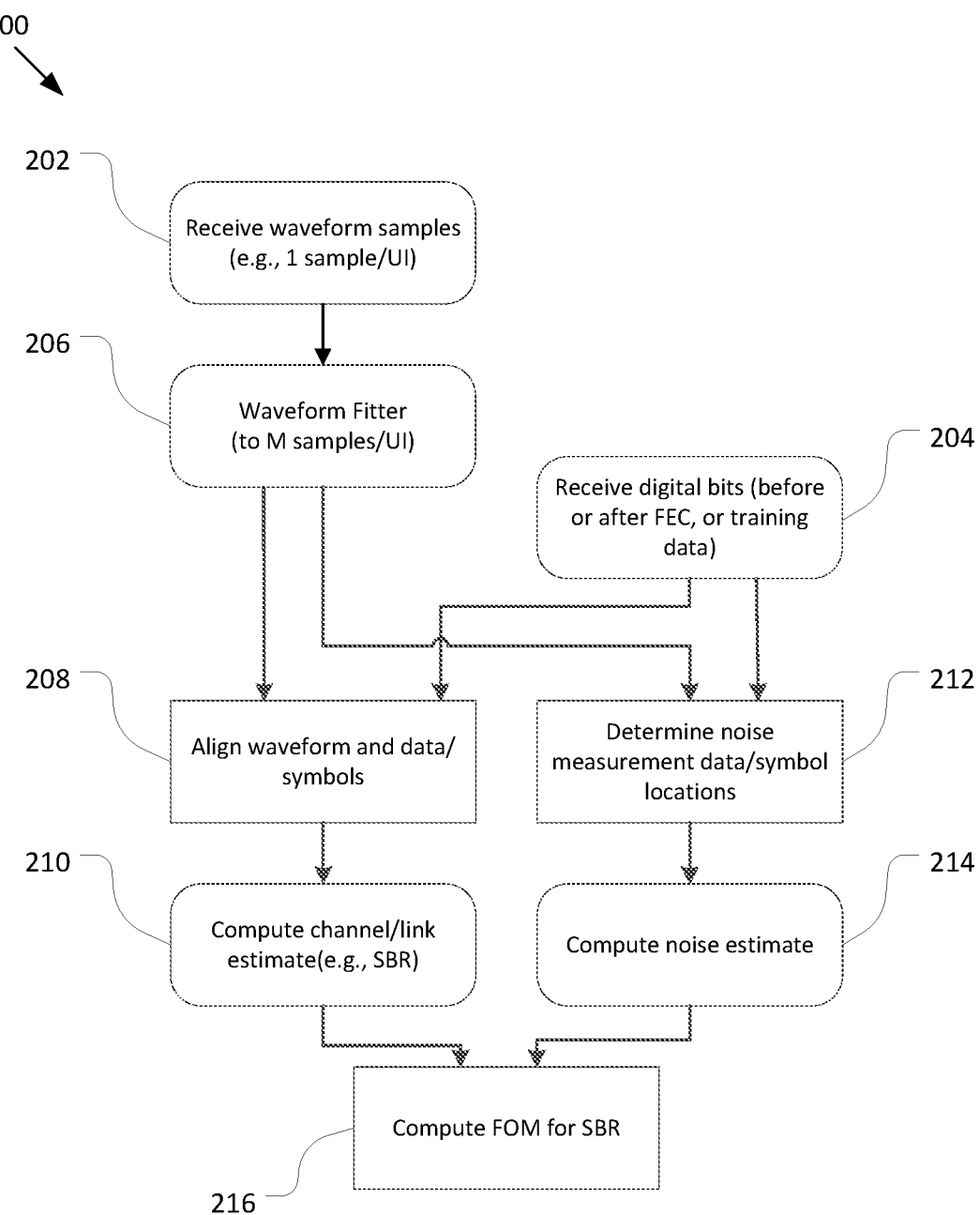
FIG. 2 illustrates a process for determination of a figure of merit (FOM) associated with a communication link, in accordance with various embodiments.

For example, FIG. 2 illustrates a process 200 for determining a FOM of a communication link in accordance with various embodiments. In some embodiments, the process 200 may be performed by the link monitoring circuitry 108 (e.g., channel estimate engine 148).

At 202 of the process 200, the link monitoring circuitry may receive, from the receiver, the samples of the analog waveform that corresponds to the data signal. The samples may be received before or after equalization, as discussed above, At 204 of the process 200, the link monitoring circuitry may receive the digital bits that correspond to the data signal. For example, the digital bits may be recovered by the receiver from the data signal (e.g., before or after error correction, such as FEC) and/or may be a known training data pattern that corresponds to the data signal.

At 206 of the process 200, the link monitoring circuitry may perform waveform fitting to generate a fitted waveform. For example, the samples received by the link monitoring circuitry may have a first number, N of samples per UI, and the waveform fitting may upsample the fitted waveform to have a second number, M, of samples per UI, where M is greater than N. In some embodiments, N may be 1 sample per UI. Accordingly, no additional ADCs may be needed, apart from the ADC that is already included in the receiver (e.g., ADC 132 of receiver 102). Alternatively, additional ADCs may be included in the link monitoring circuitry to generate additional samples of the analog waveform. In some embodiments, the process described by the present inventors in U.S. patent application Ser. No. 17/029,445 may be used to perform the waveform fitting at 206 of the process 200.

At 208 of the process 200, the link monitoring circuitry may align the fitted waveform with the digital bits to generate an aligned waveform. The alignment may be performed, for example, using cross-correlation, bit-inversion detection, and/or level matching. In some embodiments, the cross-correlation process may account for jitter effects, such as duty cycle distortion and/or sinusoidal jitter. A serializer-deserializer (SerDes) of the transmitter and/or receiver may be designed using half-rate or quarter-rate architectures, which may include duty-cycle distortion. In some embodiments the alignment may be performed without a clock signal or an accurate clock period. For example, the cross correlation may be performed using a flexible and/or custom clock period.

At 210 of the process 200, the link monitoring circuitry may compute a channel/link estimate based on the aligned waveform. For example, the channel link estimate may include an impulse response, such as an SBR. In one example, the impulse response may be derived using the recovered data pattern and the measured waveform using linear fitting. The waveform may be the convolution of the pulse response and the digital symbol pattern, e.g., Y=PX, where IP is the pulse response used as the link/channel estimate, Y is the measured waveform samples, and X is the recovered data pattern (digital bits) after FEC correction. In most cases, P is shorter than Y. Accordingly, in some embodiments, the linear fitting may use minimum mean squared error (MMSE) to minimize the difference between the measured waveform and synthesized waveform generated from the found pulse response, e.g., according to: $P=YX^T(XX^T)^{-1}$, wherein T corresponds to the matrix transpose operator.

At 212 of the process 200, the link monitoring circuitry may determine time locations for a noise measurement. The time locations may correspond to samples of the fitted waveform within a time period. For example, the time period may be selected to correspond to a portion of the samples for which the associated digital bits have the same logic value.

At 214 of the process 200, the link monitoring circuitry may compute a noise estimate based on the time locations. For example, the noise estimate may be made on the analog waveform (e.g., using the received samples, the fitted samples, and/or another representation of the analog waveform). In some embodiments, the techniques described by the present inventors in U.S. Pat. No. 10,020,967 may be used to estimate one or more noise components, such as random noise, deterministic noise, bounded uncorrelated noise, etc., in the received waveform.

At 216 of the process 200, the link monitoring circuitry may compute a FOM based on the channel/link estimate (e.g., SBR) and noise estimate. The FOM may include one or more metrics, such as SNR, SNR, COM, link margin, etc. In some embodiments, the FOM may account for the potential of the link, e.g., by being based on one or more of transmitter EQ parameter(s), receiver EQ parameter(s), system/device induced jitter and/or noise, and/or error correction (e.g., FEC) gain.

Accordingly, the process 200 may enable determination of an FOM that indicates a quality and/or health of the communication channel/link. As discussed herein, the FOM may be used for one or more purposes, such as to monitor the health of the communication link over time, and/or to determine a modulation scheme and/or configuration to use for communication over the communication link.

Figure 3:
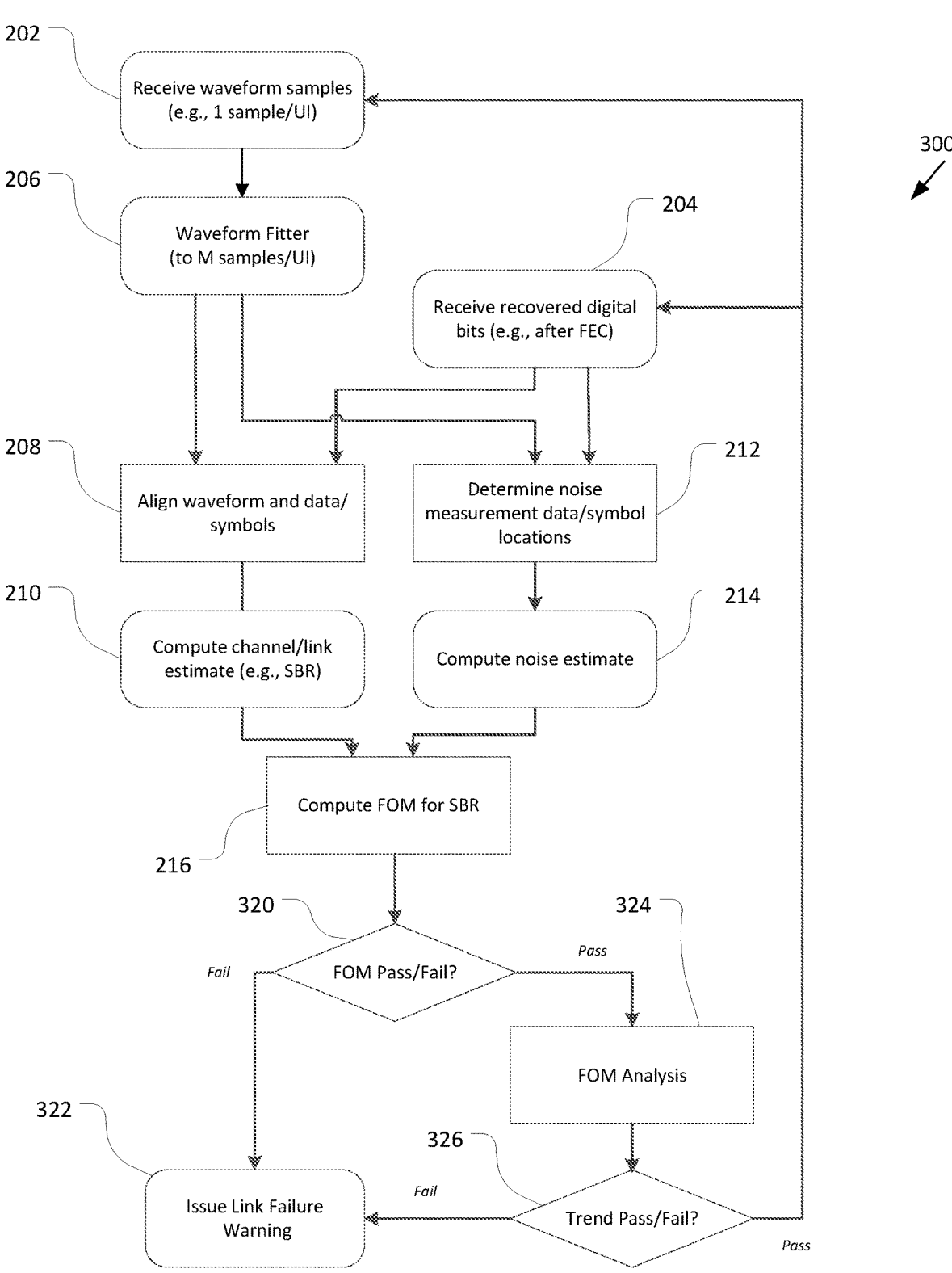
FIG. 3 schematically illustrates a process for health monitoring of a communication link, in accordance with various embodiments.

For example, FIG. 3 illustrates a process 300 for health monitoring of a communication link, in accordance with various embodiments. The process 300 may be performed by the link monitoring circuitry 108. For example, the process 300 may be performed by the channel estimate engine 148 and/or health monitoring engine 150.

In various embodiments, the process 300 may use the process 200 to determine the FOM for the communication link at 216. For the health monitoring use case, real data may be used as opposed to training data. Additionally, it may be preferable to use the digital bits after error correction is applied (e.g., corresponding to the arrow 158b of FIG. 1), since that will indicate the ability of the receiver to recover the encoded data.

At 320 of the process 300, the health monitoring engine may determine whether the FOM passes or fails a health test, e.g., based on comparison with a threshold. If the FOM fails, then, at 322 of the process 300, the health monitoring engine may issue a link failure warning. For example, the link failure warning may be sent to the transmitter and/or receiver. In some embodiments, the transmitter and/or receiver may take one or more actions to remediate the failure, such as changing one or more configuration parameters for the communication link.

At 324 of the process 300, the health monitoring engine may perform FOM analysis. In some embodiments, the FOM analysis may include determination of one or more trends or other metrics based on the FOM and prior values of the FOM. In some embodiments, the FOM analysis may be performed if the health test at 320 passes. Alternatively, the FOM analysis at 324 may be performed whether or not the health test at 320 passes.

At 326 of the process 300, the health monitoring engine may determine whether the trend passes or fails a trend test. For example, the trend test may be failed if the trend is worsening (e.g., more than a threshold rate and/or based on another metric). If the trend test is failed, then a link failure warning may be issued at 322. Otherwise, the process 300 continues to another iteration of the process 200 to determine another FOM.

As discussed above with respect to FIG. 1, in some embodiments the link monitoring circuitry 108 may additionally or alternatively include modulation selection engine 152 to determine a modulation scheme to use for the communication link 106. For example, the link monitoring circuitry 108 may determine respective FOMs for a plurality of modulation schemes and select the modulation scheme based on the FOM (e.g., with the best FOM). The plurality of modulation schemes may include any suitable modulation schemes, such as n-level phase amplitude modulation (PAM-n), non-return to zero (NRZ) modulation, quadrature amplitude modulation (QAM), etc.

In some embodiments, the link monitoring circuitry 108 may use a known training data set for determination of the FOMs. Additionally, in some embodiments, the link monitoring circuitry 108 may use 1 sample per UI of the analog waveform for determination of the FOMs, as discussed above. Alternatively, the link monitoring circuitry 108 may include one or more additional ADCs to generate additional samples of the analog waveform per UI.

Figure 4:
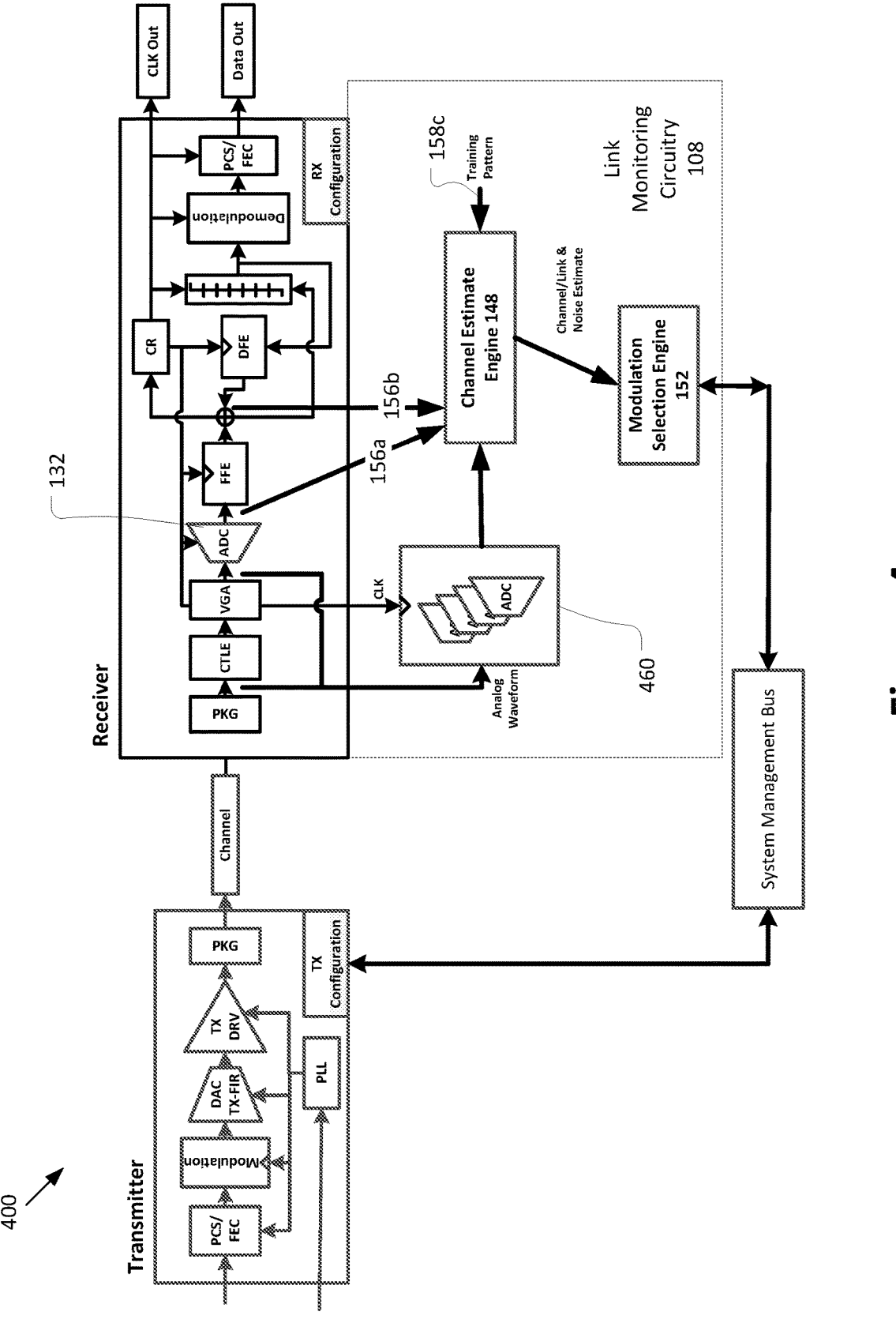
FIG. 4 illustrates an example implementation of the system of FIG. 1 that includes additional analog-to-digital converters (ADCs) and may be used for selection of a modulation scheme, in accordance with various embodiments.

For example, FIG. 4 illustrates a system 400 that shows an example implementation of link monitoring circuitry 108 for modulation scheme selection (e.g., using modulation selection engine 150). The link monitoring circuitry 108 includes additional ADCs 460 to generate additional samples of the analog waveform and provide the additional samples to the channel estimate engine 148. The channel estimate engine 148 may further receive the samples of the analog waveform from the ADCs 460 (e.g., before equalization, as indicated by arrow 156a and/or after equalization, as indicated by arrow 156b). The channel estimate engine 148 may further receive the known training data (e.g., as indicated by 158c).

Figure 5:
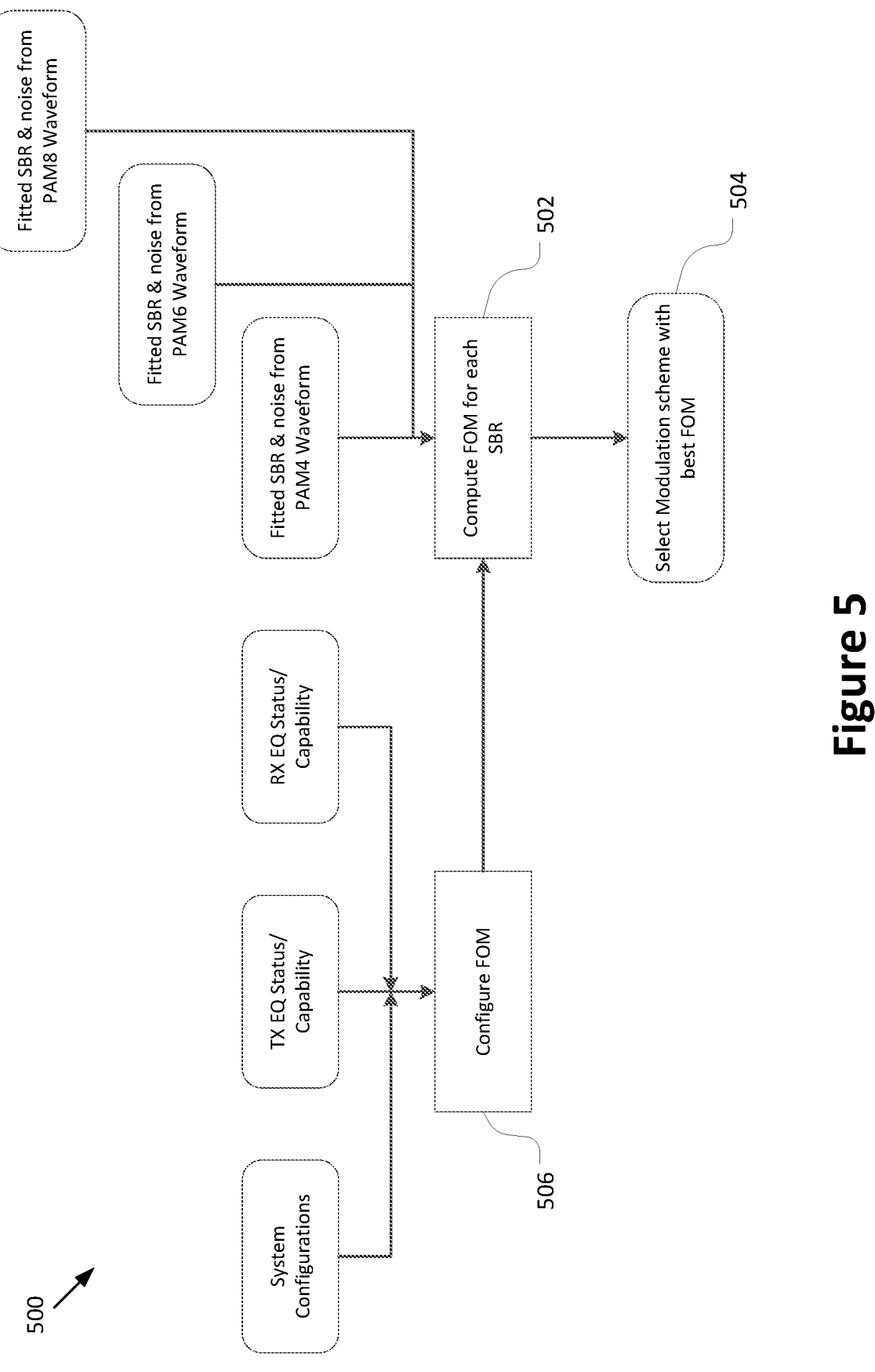
FIG. 5 illustrates a process for modulation scheme selection, in accordance with various embodiments.

FIG. 5 illustrates an example process 500 for modulation scheme selection, in accordance with various embodiments. The process 500 may be performed by link monitoring circuitry, such as link monitoring circuitry 108 of system 100 and/or system 400. In some embodiments, the process 500 may be performed during link initialization. At 502, the process 500 may include determining a FOM for each SR-B associated with different respective modulation schemes. At 504, the process 500 may include selecting the modulation scheme with the best FOM.

In some embodiments, the process 500 may further include, at 506, configuring one or more parameters for the FOM calculation, e.g., based on a system configuration, a Tx status and/or capability, an Rx status and/or capability, and/or another consideration. The configuring of the FOM may account for potential (e.g., link margin) of the communication link with or without the effects of additional equalization timing noise, amplitude noise, etc.

In some embodiments, the SBRs and/or noise estimates for the different modulation schemes may be obtained by transmitting training data over the communication link using each of the respective modulation schemes and performing the process 200 of FIG. 2 described herein.

Figure 6:
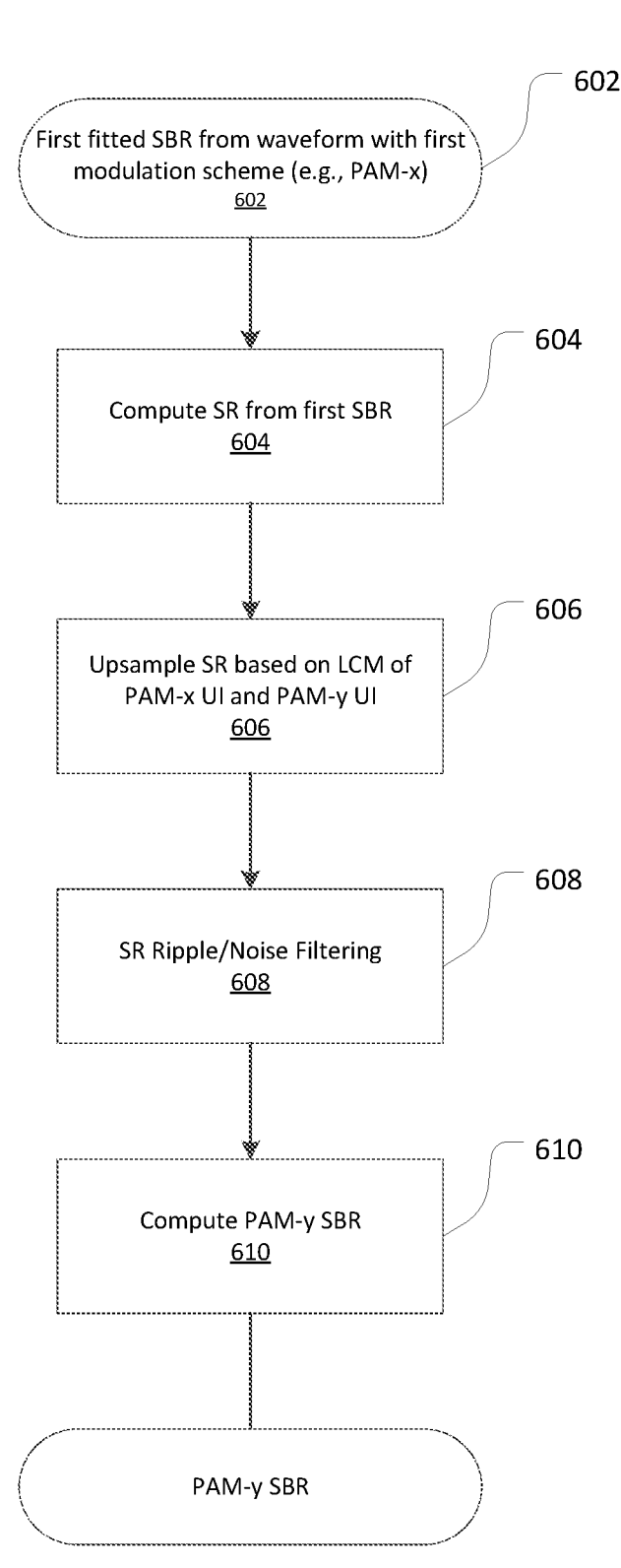
FIG. 6 illustrates a process for determining a second single bit response (SBR) for a second modulation scheme based on a first SBR for a first modulation scheme, in accordance with various embodiments.

Alternatively, in some embodiments, the training data may be transmitted using a first modulation scheme of the modulation schemes, and the SBRs for the other modulation schemes may be determined from a first SBR of the first modulation scheme. For example, FIG. 6 illustrates a process 600 for determining a second SBR for a second modulation scheme from a first SBR for a first modulation scheme. The process 600 is illustrated using the example of the first modulation scheme being PAM-x and the second modulation scheme being PA-M-y, where x and y are different values (e.g., 2, 4, 6, 8, etc.). However, the process 600 may also be extended to other modulation schemes, such as NRZ, QAM, etc.

At 602, the process 600 may include receiving the first SBR for the first modulation scheme (e.g., PAM-x). The first SBR may be determined from the fitted waveform from samples of the data signal transmitted using the first modulation scheme.

At 604, the process 600 may further include computing a step response (SR) from the first SBR. At 606, the process 600 may further include upsampling the SR based on the least common multiple (LCM) of the PAM-x UI and the PAM-y UI At 608, the process 600 may further include performing SR ripple and/or noise filtering on the upsampled SR.

At 610, the process 600 may further include computing the SB3R for the second modulation scheme (e.g., PAM-y) from the output of operation 608.

Accordingly, the process 600 may enable SBR_s for one or more additional modulation schemes to be generated from a first SBR associated with a first modulation scheme. Therefore, the process 600 may enable the FOMs to be determined for the plurality of modulation schemes without transmitting test data signals over the communication link using all of the modulation schemes.

At higher bandwidth of the communication link (e.g., 224 Gbps), the channel and/or circuit bandwidth may become a limiting factor. For example, channel components, such as connectors and/or printed circuit boards (PCBs) may not have sufficient bandwidth to support PAM4 modulation, which is used for some 50 and 100 Gbps links. Furthermore, a single modulation scheme, such as PAM4, may not be able to cover channels with various link lengths. The techniques described herein may enable determination of the optimal modulation scheme based on the characteristics of the communication link. For example, PAM4 may be used for short link lengths, while PAM6, PAM8, or another modulation scheme may be used for longer link lengths. The techniques may also be useful for FPGA implementations, in which proprietary serial communication links and/or protocols may be used. The techniques described herein for modulation scheme selection and/or configuration selection may improve the efficiency of such implementations.

As discussed above with respect to FIG. 1, in some embodiments the link monitoring circuitry 108 may additionally or alternatively include configuration engine 154 to determine a configuration of the receiver 102 and/or transmitter 104. For example, in some embodiments, a FOM may be determined for a plurality of different configurations, and a first configuration may be selected from the FOMs for the plurality of different configurations and/or otherwise determined from the plurality of configurations. In embodiments, the configuration parameters determined by the configuration engine 154 may include one or more of a modulation scheme, SerDes functions (e.g., equalization parameter(s) such as an equalizer tap length, a Tx output amplitude, a DAC/ADC resolution, circuitry/FPGA/ASIC core functions (e.g., FEC parameter(s), bit-interleaving and/or bit multiplexing parameter(s), coding and/or pre-coding parameter(s)), and/or other parameters.

In some embodiments, the configuration engine 154 may determine the first configuration to use based on a target FOM. Accordingly, rather than maximizing the FOM, the configuration engine 154 may balance other considerations to select the first configuration while providing the target FOM. For example, the target FOM may be determined based on performance, power, and/or latency requirements.

Figure 7:
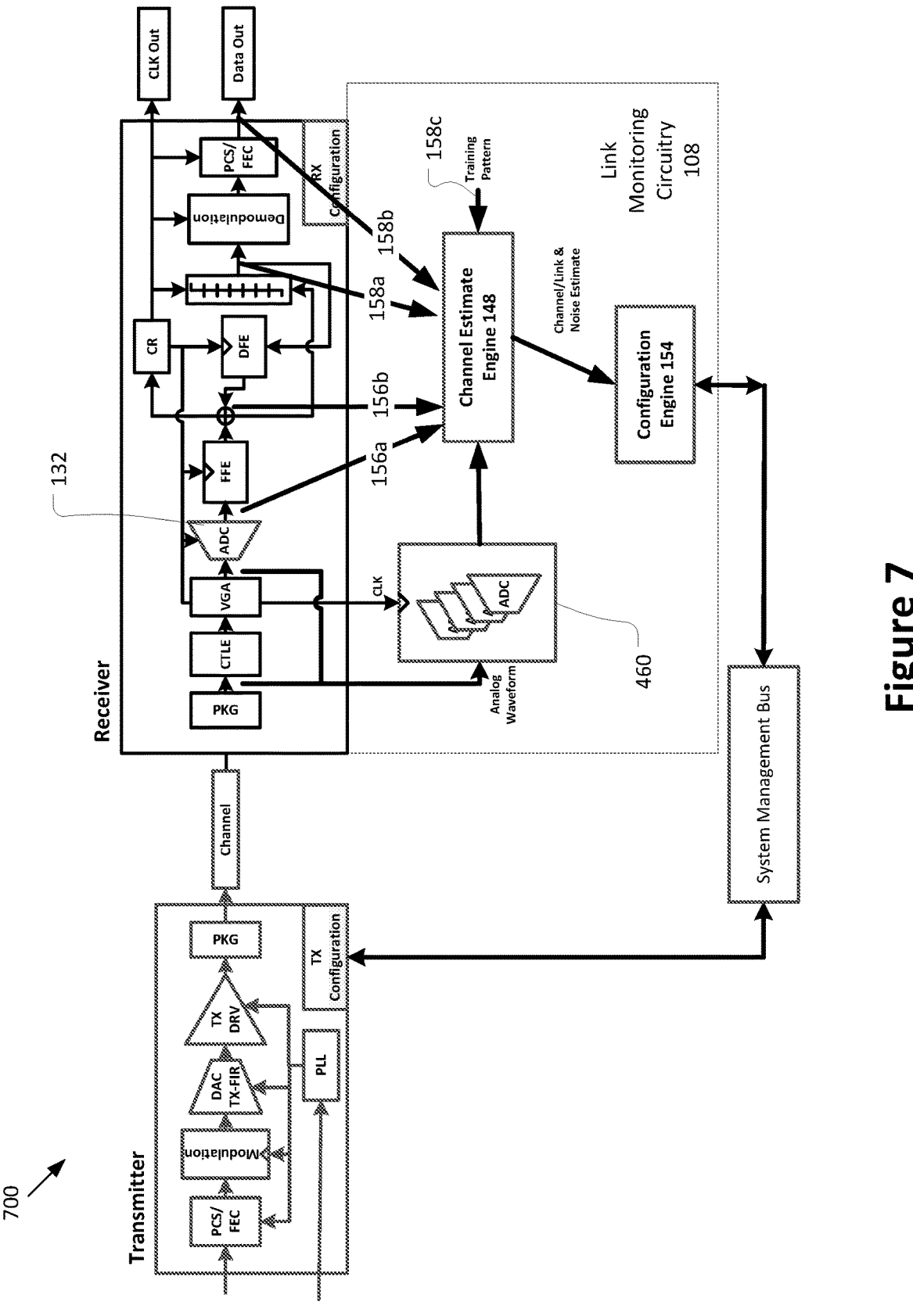
FIG. 7 illustrates an example implementation of the system of FIG. 1 for determination of one or more configuration parameters associated with a communication link, in accordance with various embodiments.

FIG. 7 illustrates a system 700 that shows an example implementation of link monitoring circuitry 108 for configuration determination (e.g., using configuration engine 152). As shown, the link monitoring circuitry 108 includes additional ADCs 460 to generate additional samples of the analog waveform and provide the additional samples to the channel estimate engine 148. The channel estimate engine 148 may further receive the samples of the analog waveform from the ADCs 460 (e.g., before equalization, as indicated by arrow 156a and/or after equalization, as indicated by arrow 156b). The channel estimate engine 148 may further receive the digital bits recovered by the receiver (e.g., before FEC, as indicated by arrow 158a and/or after FEC, as indicated by arrow 158b). In some embodiments, the configuration may be determined based on training data transmitted over the transmission link, and the channel estimate engine 148 may further receive the known training data (e.g., as indicated by 158c).

Figure 8:
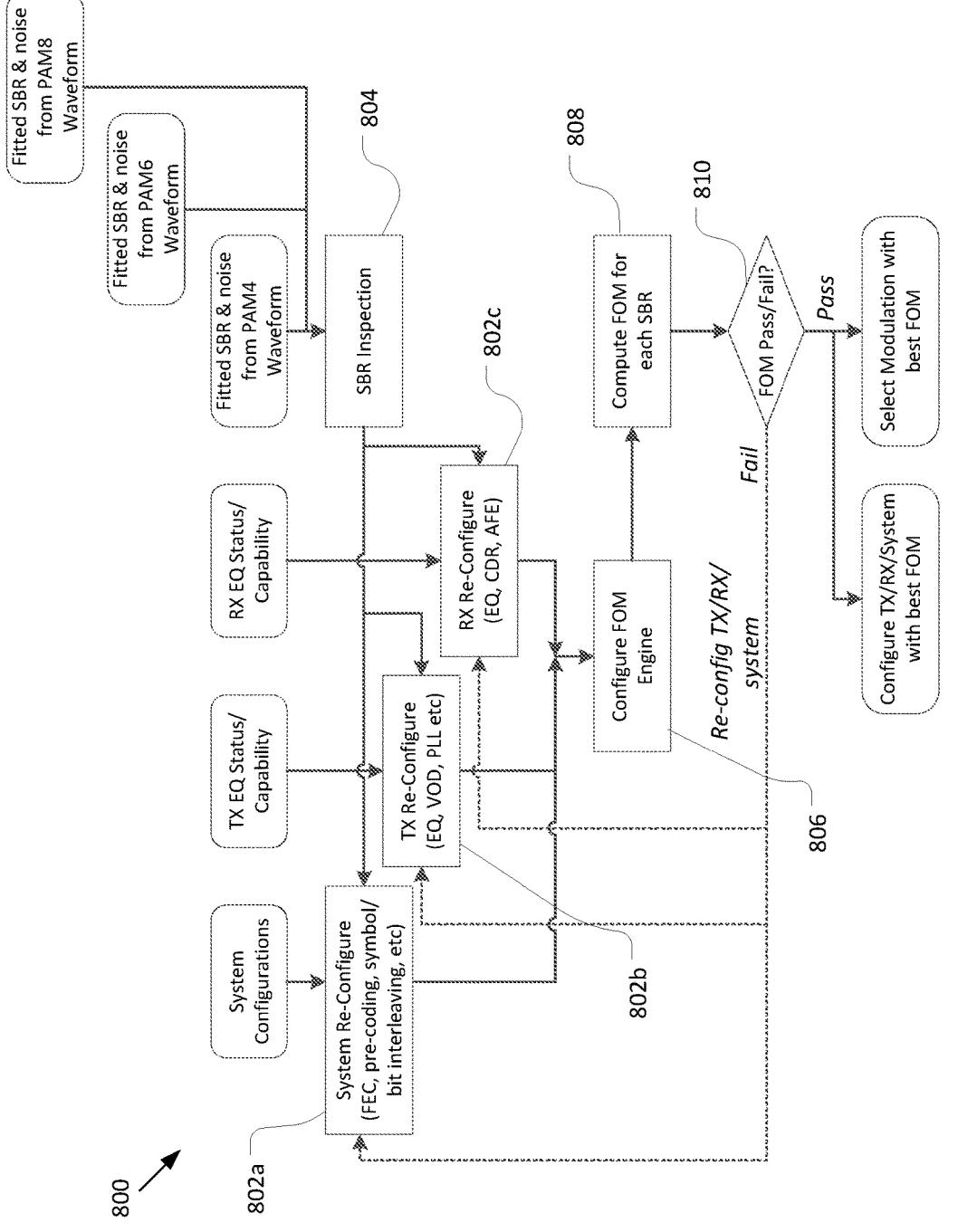
FIG. 8 illustrates an example process for determination of one or more configuration parameters associated with a communication link, in accordance with various embodiments.

FIG. 8 illustrates an example process 800 for determination of one or more configuration parameters associated with the communication link, in accordance with various embodiments. The process 800 may be performed by link monitoring circuitry, such as link monitoring circuitry 108 of system 100 and/or system 700.

The process 800 may include block 802a to reconfigure one or more system parameters (e.g., FEC, pre-coding, symbol/bit interleaving, etc.), block 802b to reconfigure one or more transmission parameters (e.g., EQ, VOD, PLL, etc.), and/or block 802c to reconfigure one or more reception parameters (e.g., EQ, CDR, AFE, etc.). In embodiments, a preliminary configuration may be acquired by inspecting the SBR at 804 of the process 800. For example, if there is significant reflections in the SBR, the EQ tap length may be adjusted accordingly.

At 806, the FOM engine may be configured to set a target FOM and/or other parameters for the FOM or associated configuration. At 808, an FOM may be determined for the SBR and configuration. At 810, it may be determined, based on the FOM, whether to use the current configuration or change one or more parameters of the configuration. For example, the process 800 may be used to determine a configuration that is targeted (e.g., optimized) to a target FOM. If the determined FOM is greater than the target FOM, one or more parameters may be adjusted, e.g., to provide reduced power consumption and/or latency.

In some embodiments, the process 800 may further be used to determine a modulation scheme to use and/or to determine a configuration to use for a given modulation scheme. For example, the process 800 may be performed using training data transmitted over the communication link via multiple transmission links. Alternatively, the training data may be transmitted over a first communication link to determine a first SBR, and a second SBR for a second modulation scheme may be determined based on the first SBR (e.g., using the process 600 of FIG. 6).

Figure 9:
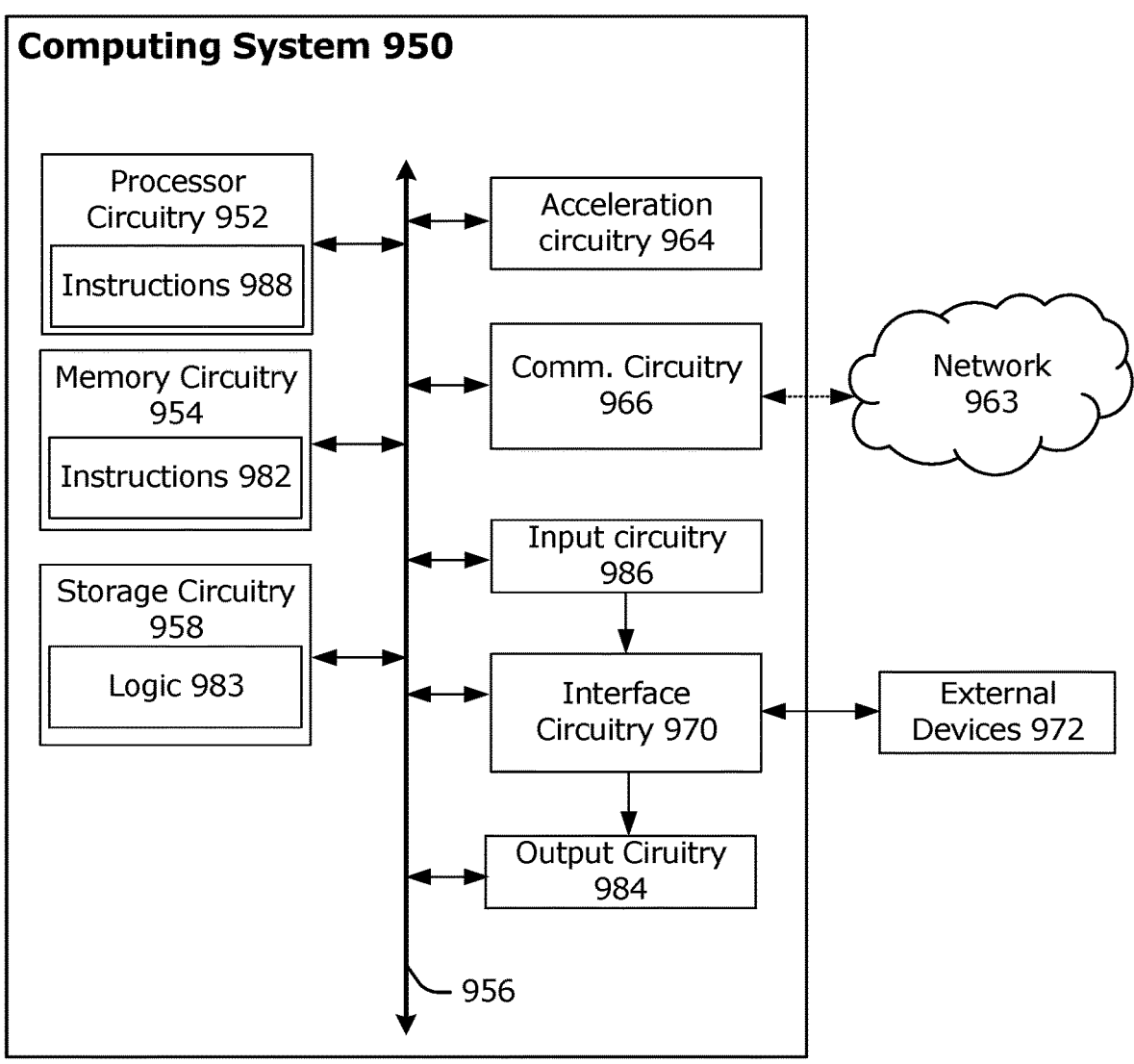
FIG. 9 illustrates an example system configured to employ the apparatuses and methods described herein, in accordance with various embodiments.

FIG. 9 illustrates an example of components that may be present in a computing system 950 for implementing the techniques described herein. The computing system 950 may include any combinations of the hardware or logical components referenced herein. The components may be implemented as ICs, portions thereof, discrete electronic devices, or other modules, instruction sets, programmable logic or algorithms, hardware, hardware accelerators, software, firmware, or a combination thereof adapted in the computing system 950, or as components otherwise incorporated within a chassis of a larger system. For one embodiment, at least one processor 952 may be packaged together with computational logic 982 and configured to practice aspects of various example embodiments described herein to form a Sy stem in Package (SiP) or a System on Chip (SoC).

In embodiments, the link monitoring circuitry and/or associated techniques described herein may be used for communication between the system 950 and one or more other devices via a wired or wireless communication link, e.g., using interface circuitry 970, input circuitry 986, output circuitry 986, and/or communication circuitry 966. Additionally, or alternatively, the link monitoring circuitry and/or associated techniques described herein may be used for communication between components of the system 950, e.g., via bus 956.

The system 950 includes processor circuitry in the form of one or more processors 952. The processor circuitry 952 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 952 may include one or more hardware accelerators (e.g., same or similar to acceleration circuitry 964), which may be microprocessors, programmable processing devices (e.g. FPGA, ASIC, etc.), or the like. The one or more accelerators may include, for example, computer vision and/or deep learning accelerators. In some implementations, the processor circuitry 952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 952 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 952 may be coupled with or may include memory/storage and may be configured to execute instructions stored in the memory/ storage to enable various applications or operating systems to run on the platform 950. The processors (or cores) 952 is configured to operate application software to provide a specific service to a user of the platform 950. In some embodiments, the processor(s) 952 may be a special-purpose processor(s)/controller(s) configured (o r configurable) to operate according to the various embodiments herein.

As examples, the processor(s) 952 may include an Intel® Architecture Core™ based processor such as an i3, an i5, an i7, an i9 based processor; an Intel® microcontroller-based processor such as a Quark™, an Atom™, or other MCU-based processor; Pentium processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxCPUs, Epyc® processor(s), or the like; A5-A12 and/or S1-S4 processor(s) from Apple® Inc., Snapdragon™ or Centriq™ processor(s) from Qualcomm® Technologies, Inc., Texas Instruments, Inc.® Open Multimedia Applications Platformm (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.;

or the like. In some implementations, the processor(s) 952 may be a part of a system on a chip (SoC), System-in-Package (SiP), a multi-chip package (MCP), and/or the like, in which the processor(s) 952 and other components are formed into a single integrated circuit, or a single package, such as the Edison™ or Galileo™ SoC boards from Intel® Corporation. Other examples of the processor(s) 952 are mentioned elsewhere in the present disclosure.

The system 950 may include or be coupled to acceleration circuitry 964, which may be embodied by one or more artificial intelligence (AI)/machine learning (ML) accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as complex (CPLDs) or high complexity PLDs (HCPLDs), and/or other forms of specialized processors or circuitry designed to accomplish one or more specialized tasks. These tasks may include AI/ML processing (e.g., including training, inferencing, and classification operations), visual data processing, network data processing, object detection, rule analysis, or the like. In FPGA-based implementations, the acceleration circuitry 964 may comprise logic blocks or logic fabric and other interconnected resources that may be programmed (configured) to perform various functions, such as the procedures, methods, functions, etc. of the various embodiments discussed herein. In such implementations, the acceleration circuitry 964 may also include memory cells (e.g., EPROM, EEPROM, flash memory, static memory (e.g., SRAM, anti-fuses, etc.) used to store logic blocks, logic fabric, data, etc. in LUTs and the like.

In some implementations, the processor circuitry 952 and/or acceleration circuitry 964 may include hardware elements specifically tailored for machine learning and/or artificial intelligence (AI) functionality. In these implementations, the processor circuitry 952 and/or acceleration circuitry 964 may be, or may include, an AI engine chip that can run many different kinds of AI instruction sets once loaded with the appropriate weightings and training code. Additionally or alternatively, the processor circuitry 952 and/or acceleration circuitry 964 may be, or may include, AI accelerator(s), which may be one or more of the aforementioned hardware accelerators designed for hardware acceleration of AI applications. As examples, these processor(s) or accelerators may be a cluster of artificial intelligence (AI) GPUs, tensor processing units (TPUs) developed by Google® Inc., Real AI Processors (RAPs™) provided by AlphaICs®, Nervana™ Neural Network Processors (NNPs) provided by Intel® Corp., Intel) Movidius™ Myriad™ X Vision Processing Unit (VPU), NVIDIA® PX™ based CPUs, the NM500 chip provided by General Vision®, Hardware 3 provided by Tesla®, Inc., an Epiphany™ based processor provided by Adapteva®, or the like. In some embodiments, the processor circuitry 952 and/or acceleration circuitry 964 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like. In some hardware-based implementations, individual subsystems of system 950 may be operated by the respective AI accelerating co-processor(s), AI GPUs, TPUs, or hardware accelerators (e.g., FPGAs, ASICs, DSPs, SoCs, etc.), etc., that are configured with appropriate logic blocks, bit stream(s), etc. to perform their respective functions.

The system 950 also includes system memory 954. Any number of memory devices may be used to provide for a given amount of system memory. As examples, the memory 954 may be, or include, volatile memory such as random access memory (RAM), static RAM (SRAM), dynamic RAM (DRAM), synchronous DRAM (SDRAM), RAM-BUS) Dynamic Random Access Memory (RDRAM®), and/or any other desired type of volatile memory device. Additionally or alternatively, the memory 954 may be, or include, non-volatile memory such as read-only memory (ROM), erasable programmable ROM (EPROM), electrically erasable programmable (EEPROM), flash memory, non-volatile RAM, ferroelectric RAM, phase-change memory (PCM), flash memory, and/or any other desired type of non-volatile memory device. Access to the memory 954 is controlled by a memory controller. The individual memory devices may be of any number of different package types such as single die package (SDP), dual die package (DDP) or quad die package (Q17P). Any number of other memory implementations may be used, such as dual inline memory modules (DIMMs) of different varieties including but not limited to micro DIMMs or MiniDIMMs.

Storage circuitry 958 provides persistent storage of information such as data, applications, operating systems and so forth. In an example, the storage 958 may be implemented via a solid-state disk drive (SSDD) and/or high-speed electrically erasable memory (commonly referred to as "flash memory"). Other devices that may be used for the storage 958 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, spintronic magnetic junction memory based device, a magnetic tunneling junction (MTJ) based device, a Domain Wall (DW) and Spin Orbit Transfer (SOT) based device, a thyristor based memory device, a hard disk drive (HDD), micro HDD, of a combination thereof, and/or any other memory. The memory circuitry 954 and/or storage circuitry 958 may also incorporate three-dimensional (3D) cross-point (XPOINT) memories from Intel® and Micron®.

The memory circuitry 954 and/or storage circuitry 958 is/are configured to store computational logic 983 in the form of software, firmware, microcode, or hardware-level instructions to implement the techniques described herein. The computational logic 983 may be employed to store working copies and/or permanent copies of programming instructions, or data to create the programming instructions, for the operation of various components of system 900 (e.g., drivers, libraries, application programming interfaces (APIs), etc.), an operating system of system 900, one or more applications, and/or for carrying out the embodiments discussed herein. The computational logic 983 may be stored or loaded into memory circuitry 954 as instructions 982, or data to create the instructions 982, which are then accessed for execution by the processor circuitry 952 to carry out the functions described herein. The processor circuitry 952 and/or the acceleration circuitry 964 accesses the memory circuitry 954 and/or the storage circuitry 958 over the interconnect (IX) 956. The instructions 982 direct the processor circuitry 952 to perform a specific sequence or flow of actions, for example, as described with respect to flowchart(s) and block diagram(s) of operations and functionality depicted previously. The various elements may be implemented by assembler instructions supported by processor circuitry 952 or high-level languages that may be compiled into instructions 981, or data to create the instructions 981, to be executed by the processor circuitry 952. The permanent copy of the programming instructions may be placed into persistent storage devices of storage circuitry 958 in the factory or in the field through, for example, a distribution medium (not shown), through a communication interface (e.g., from a distribution server (not shown)), over-the-air (OTA), or any combination thereof.

The IX 956 couples the processor 952 to communication circuitry 966 for communications with other devices, such as a remote server (not shown) and the like. The communication circuitry 966 is a hardware element, or collection of hardware elements, used to communicate over one or more networks 963 and/or with other devices. In one example, communication circuitry 966 is, or includes, transceiver circuitry configured to enable wireless communications using any number of frequencies and protocols such as, for example, the Institute of Electrical and Electronics Engineers (IEEE) 802.11 (and/or variants thereof), IEEE 802.7.4, Bluetooth® and/or Bluetooth® low energy (BLE), Zig-Bee®, LoRaWAN™ (Long Range Wide Area Network), a cellular protocol such as 3GPP LTE and/or Fifth Generation (5G)/New Radio (NR), and/or the like. Additionally or alternatively, communication circuitry 966 is, or includes, one or more network interface controllers (NICs) to enable wired communication using, for example, an Ethernet connection, Controller Area Network (CAN), Local Interconnect Network (LIN), DeviceNet, ControlNet, Data Highway+, or PROFINET, among many others.

The IX 956 also couples the processor 952 to interface circuitry 970 that is used to connect system 950 with one or more external devices 972. The external devices 972 may include, for example, sensors, actuators, positioning circuitry (e.g., global navigation satellite system (GNSS)/Global Positioning System (GPS) circuitry), client devices, servers, network appliances (e.g., switches, hubs, routers, etc.), integrated photonics devices (e.g., optical neural network (ONN) integrated circuit (IC) and/or the like), and/or other like devices.

In some optional examples, various input/output (I/O) devices may be present within or connected to, the system 950, which are referred to as input circuitry 986 and output circuitry 984 in FIG. 9. The input circuitry 986 and output circuitry 984 include one or more user interfaces designed to enable user interaction with the platform 950 and/or peripheral component interfaces designed to enable peripheral component interaction with the platform 950. Input circuitry 986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 984 may be included to show information or otherwise convey information, such as sensor readings, actuator position(s), or other like information Data and/or graphics may be displayed on one or more user interface components of the output circuitry 984. Output circuitry 984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Crystal Displays (LCD). LED displays, quantum dot displays, projectors, etc.), with the output of characters, graphics, multimedia objects, and the like being generated or produced from the operation of the platform 950. The output circuitry 984 may also include speakers and/or other audio emitting devices, printer(s), and/or the like. Additionally or alternatively, sensor(s) may be used as the input circuitry 984 (e.g., an image capture device, motion capture device, or the like) and one or more actuators may be used as the output device circuitry 984 (e.g., an actuator to provide haptic feedback or the like). Peripheral component interfaces may include, but are not limited to, a non-volatile memory port, a USB port, an audio jack, a power supply interface, etc. In some embodiments, a display or console hardware, in the context of the present system, may be used to provide output and receive input of an edge computing system; to manage components or services of an edge computing system; identify a state of an edge computing component or service; or to conduct any other number of management or administration functions or service use cases.

The components of the system 950 may communicate over the IX 956. The IX 956 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 956 may be a proprietary bus, for example, used in a SoC based system.

The number, capability, and/or capacity of the elements of system 900 may vary, depending on whether computing system 900 is used as a stationary computing device (e.g., a server computer in a data center, a workstation, a desktop computer, etc.) or a mobile computing device (e.g., a smartphone, tablet computing device, laptop computer, game console, IoT device, etc.). In various implementations, the computing device system 900 may comprise one or more components of a data center, a desktop computer, a workstation, a laptop, a smartphone, a tablet, a digital camera, a smart appliance, a smart home hub, a network appliance, and/or any other device/system that processes data.

Examples

Some non-limiting examples of various embodiments are provided below.

Example 1 is a circuit comprising: a receiver to receive a data signal from a transmitter; and a link monitoring circuit coupled to the receiver. The link monitoring circuit is to: receive, from the receiver, samples of an analog waveform that corresponds to the received data signal; receive digital bits that correspond to the data signal; and determine a figure of merit (FOM) of a communication link with the transmitter based on the samples and the digital bits.

Example 2 is the circuit of Example 1, wherein the receiver is to determine the digital bits from the data signal and provide the digital bits to the link monitoring circuit before or after a forward error correction is applied by the receiver.

Example 3 is the circuit of Example 1, wherein the samples are received by the link monitoring circuit before or after equalization is applied by the receiver.

Example 4 is the circuit of Example 1, wherein the link monitoring circuit is to determine a single bit response (SBR) and a noise measurement based on the samples and the digital bits, wherein the FOM is determined based on the SBR and the noise measurement.

Example 5 is the circuit of Example 4, wherein the link monitoring circuit is to: perform waveform fitting to generate a fitted waveform from the samples; align the fitted waveform with the received digital bits to generate an aligned waveform; and determine the SBR of the communication link based on the aligned waveform.

Example 6 is the circuit of Example 5, wherein the link monitoring circuit is further to identify a time period for the noise measurement based on the received digital bits.

Example 7 is the circuit of Example 1, wherein the samples of the analog waveform correspond to one sample per unit interval (UI) of the data signal.

Example 8 is the circuit of Example 1, wherein the data signal is real data received in a mission mode of the receiver, and wherein the link monitoring circuit is to periodically determine the FOM to monitor a health of the communication link.

Example 9 is the circuit of Example 1, wherein the data signal is training data encoded using a first modulation scheme, and wherein the link monitoring circuit is to: determine respective FOMs for a plurality of modulation schemes, including the first modulation scheme, based on the samples and digital bits associated with the training data; select a selected modulation scheme based on the determined FOMs; and send an indication of the selected modulation scheme to the transmitter.

Example 10 is the circuit of Example 9, wherein the samples are first samples, wherein the receiver includes a first analog-to-digital converter (ADC) to generate the first samples, wherein the link monitoring circuit includes one or more additional ADCs to generate second samples of the analog waveform, and wherein the FOM is determined further based on the second samples.

Example 11 is the circuit of Example 1, wherein the data signal is training data, and wherein the link monitoring circuit is to: determine respective FOMs using different configurations of the receiver and the transmitter; and select a first configuration for the receiver and the transmitter based on the FOMs.

Example 12 is the circuit of Example 11, wherein the first configuration is selected based on a target FOM that is associated with one or more of a performance requirement, a power requirement, or a latency requirement.

Example 13 is one or more non-transitory, computer-readable media (NTCRM) having instructions, stored thereon, that when executed by one or more processors of an apparatus, cause the apparatus to: receive samples of an analog waveform that correspond to a data signal received by a receiver via a serial communication link; receive digital bits that correspond to the data signal; determine a single bit response (SBR) and a noise estimate based on the samples and the digital bits; and determine a figure of merit (FOM) for the communication link based on the SBR and the noise estimate.

Example 14 is the one or more NTCRM of Example 13, wherein the digital bits include: digital bits recovered by the receiver without forward error correction applied; digital bits recovered by the receiver with forward error correction applied; or a training data set that corresponds to the data signal.

Example 15 is the one or more NTCRM of Example 13, wherein to determine the SER includes to: perform waveform fitting based on the samples to generate a fitted waveform that is upsampled from the samples; align the fitted waveform with the received digital bits to generate an aligned waveform; and determine the SBR of the communication link based on the aligned waveform.

Example 16 is the one or more NTCRM of Example 13, wherein the instructions, when executed, are further to cause the apparatus to identify a time period for the noise estimate based on the received digital bits.

Example 17 is the one or more NTCRM of Example 13, wherein the samples of the analog waveform correspond to one sample per unit interval (UT) of the data signal.

Example 18 is the one or more NTCRM of Example 13, wherein the data signal is real data received in a mission mode of the receiver, and wherein the instructions, when executed, are further to cause the apparatus to periodically determine the FOM to monitor a health of the communication link.

Example 19 is the one or more NTCRM of Example 13, wherein the data signal is training data encoded using a first modulation scheme of a plurality of modulation schemes, wherein the SBR is a first SBR associated with the first modulation scheme, and wherein the instructions, when executed, are further to cause the apparatus to: determine one or more second SBRs for one or more other modulation schemes of the plurality of modulation schemes based on the first SIR; determine respective FOMs for the plurality of modulation schemes based on the respective first SBR or second SBR; select a selected modulation scheme based on the determined FOMs; and send an indication of the selected modulation scheme to the transmitter.

Example 20 is the one or more NTCRM of Example 13, wherein the data signal is training data, and wherein the instructions, when executed, are further to cause the apparatus to: determine respective FOMs using different configurations of the receiver and the transmitter; select a first configuration for the receiver and the transmitter based on the FOMs and a target FOM; and send an indication of the first configuration to the receiver and the transmitter.

Example 21 is a computer system comprising: a processor; a receiver coupled to the processor, the receiver to receive a data signal for the processor over a communication link; and a link monitoring circuitry coupled to the receiver. The link monitoring circuit includes: a channel estimate engine to determine a figure of merit (FOM) for the communication link based on samples of an analog waveform that corresponds to the data signal and based on digital bits that correspond to the data signal; and control circuitry that includes a health monitoring engine to monitor a health of the communication link based on the FOM, a modulation selection engine to determine a modulation scheme to use for communication link based on the FOM, or a configuration engine determine a configuration to use for the communication link based on the FOM.

Example 22 is the computer system of Example 21, wherein the channel estimate engine is to: determine a single bit response (SBR) and a noise estimate based on the samples and the digital bits; and determine the FOM based on the SBR and the noise estimate.

Example 23 is the computer system of Example 22, wherein the channel estimate engine is to determine, based on the digital bits, locations in the analog waveform on which to perform the noise estimate.

Example 241 is the computer system of Example 21, wherein the digital bits include: digital bits recovered by the receiver without forward error correction applied; digital bits recovered by the receiver with forward error correction applied; or a training data set that corresponds to the data signal.

Example 25 is the computer system of Example 21, wherein the samples of the analog waveform correspond to one sample per unit interval (UI) of the data signal.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A circuit comprising:
a receiver to receive a data signal, wherein the data signal is training data encoded using a first modulation scheme;
a communication link coupling the receiver to a transmitter, wherein the communication link provides the data signal from the transmitter to the receiver;
a link monitoring circuit coupled to the receiver, the link monitoring circuit to:
receive samples of an analog waveform that corresponds to the data signal from the receiver;
determine respective single bit responses (SBRs) for a plurality of modulation schemes based on the samples and digital bits associated with the training data, wherein the plurality of modulation schemes comprises the first modulation scheme and determining a respective SBR of a second modulation scheme of the plurality of modulation schemes is based on the SBR of the first modulation scheme;
select a selected modulation scheme based at least in part on the determined SBRs; and
send an indication of the selected modulation scheme to the transmitter.

2. The circuit of claim 1, wherein the receiver is to determine the digital bits of the data signal and provides the digital bits to the link monitoring circuit before or after a forward error correction is applied by the receiver.

3. The circuit of claim 1, wherein the link monitoring circuit is to receive the samples before or after equalization is applied by the receiver.

4. The circuit of claim 1, wherein the link monitoring circuit is to determine:
a noise measurement based on the digital bits, wherein a figure of merit (FOM) is determined based on the SBR and the noise measurement.

5. The circuit of claim 4, wherein the link monitoring circuit is to:
perform waveform fitting to generate a fitted waveform from the samples;

align the fitted waveform with the digital bits to generate an aligned waveform; and determine the SBR of the communication link based on the aligned waveform.

6. The circuit of claim 5, wherein the link monitoring circuit is to identify a time period for the noise measurement based on the digital bits.

7. The circuit of claim 1, wherein the samples of the analog waveform correspond to one sample per unit interval (UI) of the data signal.

8. The circuit of claim 1, wherein the data signal is real data received in a mission mode of the receiver, and wherein the link monitoring circuit is to periodically determine the determined SBRs to monitor a health of the communication link.

9. The circuit of claim 1, wherein determining the respective SBR of the second modulation scheme comprises:

computing a step response from the SBR of the first modulation scheme;

upsampling the step response;

filter the upsampled step response; and computing the respective SBR based on the filtered upsampled step response.

10. The circuit of claim 1, wherein the samples comprise first samples, wherein the receiver comprises a first analog-to-digital converter (ADC) to generate the first samples, wherein the link monitoring circuit comprises one or more additional ADCs to generate second samples of the analog waveform, and wherein the link monitoring circuit is to determine the determined SBRs based on the second samples.

11. The circuit of claim 1, wherein the data signal is training data, and wherein the link monitoring circuit is to:

determine respective SBRs using different configurations of the receiver and the transmitter; and select a first configuration for the receiver and the transmitter based on the respective SBRs.

12. The circuit of claim 11, wherein the first configuration is selected based on a target figure of merit (FOM) that is associated with one or more of a performance requirement, a power requirement, or a latency requirement.

13. One or more non-transitory, computer-readable media (NTCRM) having instructions, stored thereon, that when executed by one or more processors, cause the one or more processors to:

receive samples of an analog waveform that correspond to a data signal received by a receiver via a serial communication link, wherein the data signal is training data encoded using a first modulation scheme of a plurality of modulation schemes, and wherein the serial communication link couples the receiver to a transmitter;

determine respective single bit responses (SBRs) for a plurality of modulation schemes based on the samples and digital bits associated with the training data, wherein the plurality of modulation schemes comprises the first modulation scheme and determining a respective SBR of a second modulation scheme of the plurality of modulation schemes is based on the SBR of the first modulation scheme;

select a selected modulation scheme based at least in part on the determined SBRs; and send an indication of the selected modulation scheme to the transmitter.

14. The one or more NTCRM of claim 13, wherein the digital bits comprise:

digital bits recovered by the receiver without forward error correction applied, digital bits recovered by the receiver with forward error correction applied, a training data set that corresponds to the data signal, or any combination thereof.

15. The one or more NTCRM of claim 13, wherein determining the SBR comprises:

generate a fitted waveform by upsampling the samples;

align the fitted waveform with the digital bits to generate an aligned waveform; and determine the SBR of the serial communication link based on the aligned waveform.

16. The one or more NTCRM of claim 13, wherein the instructions, when executed, cause the one or more processors to identify a time period for a noise estimate based on the digital bits.

17. The one or more NTCRM of claim 13, wherein the samples of the analog waveform correspond to one sample per unit interval (UI) of the data signal.

18. The one or more NTCRM of claim 13, wherein the data signal is real data received in a mission mode of the receiver, and wherein the instructions, when executed, are further to cause the one or more processors to periodically determine the determined SBRs to monitor a health of the serial communication link.

19. The one or more NTCRM of claim 13, wherein determining the respective SBR of the second modulation scheme comprises:

computing a step response from the SBR of the first modulation scheme;

upsampling the step response;

filter the upsampled step response; and computing the respective SBR based on the filtered upsampled step response.

20. The one or more NTCRM of claim 13, wherein the data signal is training data, and wherein the instructions, when executed, cause the one or more processors to:

determine respective SBRs using different configurations of the receiver and the transmitter;

select a first configuration for the receiver and the transmitter based on the respective SBRs and a target SBR; and send an indication of the first configuration to the receiver and the transmitter.

21. A computer system comprising:

a processor;

a receiver coupled to the processor via a communication link, wherein the receiver receives a data signal from the processor via the communication link, wherein the data signal is training data encoded using a first modulation scheme;

a link monitoring circuitry coupled to the receiver, the link monitoring circuit comprising:

a channel estimate engine to:

receive samples of an analog waveform that correspond to the data signal:

determine respective single bit responses (SBRs) for a plurality of modulation schemes based on the samples and digital bits associated with the training data, wherein the plurality of modulation schemes comprises the first modulation scheme and determining a respective SBR of a second modulation scheme of the plurality of modulation schemes is based on the SBR of the first modulation scheme;

select a selected modulation scheme based at least in part on the determined SBRs; and send an indication of the selected modulation scheme to the processor; and control circuitry comprising:

a health monitoring engine to monitor a health of the communication link based on the determined SBRs, a modulation selection engine to determine a modulation scheme to use for communication link based on the determined SBRs; and a configuration engine determine a configuration for the communication link based on the determined SBRs.

22. The computer system of claim 21, wherein the channel estimate engine is to:

determine a noise estimate based on digital bits that correspond to the data signal; and determine a figure of merit (FOM) based on the SBR and the noise estimate.

23. The computer system of claim 22, wherein the channel estimate engine is to determine, based on the digital bits, one or more locations of the analog waveform to perform the noise estimate.

24. The computer system of claim 22, wherein the digital bits comprise digital bits recovered by the receiver without forward error correction applied, digital bits recovered by the receiver with forward error correction applied, a training data set that corresponds to the data signal, or any combination thereof.

25. The computer system of claim 21, wherein the samples of the analog waveform correspond to one sample per unit interval (UI) of the data signal.

* * * * *